United States Patent Office 2,859,086
Patented Nov. 4, 1958

2,859,086
PROCESS UTILIZING PHOSPHORINANYL DERIVATIVES FOR DYEING ARTICLES MADE FROM ACRYLONITRILE-CONTAINING POLYMERS

Theophilus A. Feild, Jr., Charleston, and Archie G. Schoonover and John H. Purse, South Charleston, W. Va., assignors to Union Carbide Corporation, a corporation of New York No Drawing. Application September 27, 1954
Serial No. 458,696

17 Claims. (Cl. 8—55)

This invention relates to improvements in methods of dyeing filaments, yarns and other shaped articles made from or containing hydrophobic resinous acrylonitrile-containing polymers and copolymers. More especially it concerns the dyeing of textiles and other articles shaped from or containing fibers and yarns made from polyacrylonitriles, and from copolymers of acrylonitrile with one or more vinyl compounds such as vinyl chloride, vinyl acetate, vinyl pyridine, vinylidene chloride, and the like.

The great difficulties encountered in efforts to dye textile articles made from hydrophobic resins have long been known. Such materials, which are not readily permeable to water, cannot be dyed satisfactorily by the ordinary procedures used in dyeing cotton, wool, natural silk and regenerated cellulose. Attempts have been made to dye such hydrophobic resin articles by using a dyeing assistant or swelling agent for the resin which facilitates penetration of the article by the dyestuff and acts as a carrier for the latter. However, many such swelling agents are effective with only one class of dyes and in addition have a tendency to cause excessive shrinkage or otherwise injure the fiber, yarn or other textile article, particularly when large amounts of the swelling agent are required for dyeing the article to a medium or dark shade.

The present invention is based upon the discovery that filaments, fibers, yarns, and other textile articles made from or containing resinous acrylonitrile-containing polymers and copolymers can be successfully dyed to give high color values with both water-soluble and water-dispersible dyestuffs for which such resins have a low affinity and normally give low color values, such as dyestuffs of the acid-type, the acetate-type, the metallized-type and the vat-type, when the dyeing operation is conducted in the presence of, or the article has been pretreated with, around 0.2% or more, based upon the weight of the article, of certain dye-carriers having in the molecule one to two 2-oxo- or -2-thiono-1,3,2-dioxaphosphorinanyl groups, said compounds having structures corresponding to the formula:

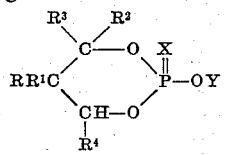

wherein R, R¹, R², R³ and R⁴, respectively, represents a radical of the class consisting of hydrogen and the alkyl groups, preferably those having one to eight carbon atoms; X represents a radical of the class consisting of oxygen and sulfur; and Y represents a member of the class consisting of the alkyl, aryl, alkaryl, haloalkyl, cyanoalkyl, and

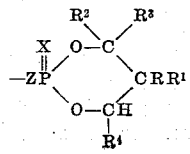

radicals wherein R, R¹, R², R³, R⁴ and X are as aforesaid, and Z represents a divalent radical having two terminal oxy groups and selected from the class consisting of the divalent dioxyalkylene residues of the alkylene glycols and polyalkylene glycols, and corresponding residues of dihydric phenols, biphenols, and diphenylolalkanes. Among such residues are those of ethylene glycol, propylene glycol, the polyethylene and polypropylene glycols, and the butylene, hexylene and octylene glycols, such as 1,3-butanediol and 2-ethyl-1,3-hexanediol; hydroquinone; 2,2-(p,p'-diphenylol)propane and (p,p'-diphenylol)methane. The increase in dye receptivity of the article is accomplished without substantial sacrifice of the properties of the fibers adapting them for the usual textile uses.

In conducting the dyeing operation the yarn or other textile article is introduced into the aqueous dyebath containing the dyeing assistant in the usual manner, or the article can be pad dyed. The quantities of the dyestuff and of the assistant can be varied in accordance with the selected dyebath ratio of liquid to textile, the dyebath temperature, the composition of the article being dyed, and the type of dyeing operation being conducted as well as to control depth of shade. A satisfactory procedure is one in which the dyebath to textile weight ratio is 30:1, and the bath contains around 3% or more of the dyestuff with from 0.2% to 10% of one or more of the aforesaid dyeing assistants, based upon the weight of the article being dyed. The dyeing preferably is conducted at temperatures around the temperature of boiling water, but temperatures within the range from 170° F. to around 212° F. or higher can be used, usually for 30 minutes or longer. When using vat dyes temperatures as low as 150° F. can be used.

In the use of these novel dye assistants it is important that the assistant be uniformly dispersed throughout the dyebath. When using an aqueous dyebath this is accomplished readily by employing any of the well known class of dispersants. Examples thereof are those being marketed under the trade names "Tergitol 4," "Tergitol 7," as described on pages 108 and 110 of "Synthetic Organic Chemicals," 13th edition, copyrighted 1952 by Carbide & Carbon Chemical Division of Union Carbide & Carbon Corporation, "Tergitol NPX," "Tergitol XC," and "Tergitol NP-35." If desired the dispersant can be added to the aqueous dyebath, and the assistant added separately with agitation. Generally the dyeing assistant is mixed previously with the dispersant. A dispersion is then formed by adding water gradually and the resultant dispersion is added to the aqueous dyebath in the amounts and at the times selected.

The dyeing assistants of this invention are operable over a wide range of dyeing conditions and notably improve the dye fixation and color values obtained by such dyeings. One of the outstanding features of these dyeing assistants is their effectiveness with such a wide range of classes of dyes. The dyeings usually exhibit good wash fastness and crock fastness. The exhaustion of the dyebaths containing these dyeing assistants is usually at least as good as in those not containing any dyeing assistant or those containing such well known dyeing assistants as p-phenylphenol.

The following examples serve to illustrate the invention. In the examples all percentages of the dyes and aqueous bath components are based upon the weight of the fiber, unless otherwise specified. A bath ratio of 30 parts of the liquid bath to 1 part of the fiber, by weight, was used in each example. In each of the examples the fastness properties of the dyed article were equal to or superior to those of the control dyeing wherein the dyeing assistant of this invention was not used.

The physical properties of the dyed article were not altered appreciably.

Example 1

A fabric knit from a yarn made from a copolymer containing 40% of acrylonitrile and 60% of vinyl chloride was scoured and immersed in a water bath having a pH of 5 and containing 5% of Xylene Milling Blue GL (C. I. No. 833, an acid-type dyestuff), 2% of 5-ethyl-2-(2-ethylhexyloxy)-2-oxo-4-propyl-1,3,2-dioxaphosphorinane, 1% of cupric sulfate, 0.5 of zinc formaldehydesulfoxylate and 1% of a dispersing agent being marketed under the trade name "Tergitol" Dispersant NP-35. A 30:1 bath to fabric ratio was used. The temperature of the dyebath and contents was raised slowly to the boil and dyeing was continued at this temperature for 1 hour. The dyed fabric then was scoured, and was dried at 115° C. for 20 minutes.

The fabric was dyed to a shade very much deeper and fuller than that secured in a similar dyeing in which the dioxaphosphorinane had been omitted from the bath, and that secured in a similar dyeing where the dyeing assistant was 2% of p-phenylphenol. There was better exhaustion of the dyebath when using the dyeing assistant of this invention; and the wash-fastness of the dyeing was substantially that of the dyeing made with no dyeing assistant.

Example 2

A fabric knit from a yarn made from a copolymer of acrylonitrile with another olefinically unsaturated compound and being marketed under the trade name "Acrilan" was scoured and then immersed in an aqueous dyebath at room temperature, adjusted to a pH of 5 with sulfuric acid, and having therein 5% of Vitrolan Orange R (Prototype No. 146) a metallized-type dyestuff, 2% of the phosphorus-containing dye assistant recited in Example 1, and 1% of "Tergitol" Dispersant NP-35. The temperature of the bath then was raised to a boil and dyeing continued at the boil for 30 minutes. Then 40% of sodium sulfate was added and dyeing continued for 30 minutes. The dyed article after scouring and drying at 115° C. for 20 minutes had an excellent uniform full shade, which was much deeper than that obtained in a similar dyeing in which the dyeing assistant was omitted.

Vitrolan Orange R is a monoazo metallized dyestuff which is a chromium complex of diazotized 2-amino-1-phenyl-4-sulfamide→1-(3-sulfamino-1-phenyl)-3-methyl-5-pyrazolone. It has the C. I. No. 18870, and the same chemical structure as "Neolan Orange R" and "Palatine Fast Orange R," described in "Bibliography of Scientific and Industrial Reports," vol. 7, page 393, October 31, 1947, and shown in Frame 9614 of P. B. report 74760, a photoprint of which is attached hereto. See also Example 2 of Ciba's U. S. Patent 1,623,005.

Example 3

Following the procedure described in Example 2, a fabric knit from a yarn made from a copolymer of acrylonitrile believed to contain at least 85% of acrylonitrile and being marketed under the trade name "Orlon" was dyed in an aqueous dyebath containing 5% of Celliton Fast Navy BA-CF (Prototype No. 232), an acetate-type dyestuff, 2% of the phosphorus compound recited in Example 1, and 1% of the said dispersing agent. Cellition Fast Navy Blue BA-CF is a composite of five dyestuffs having the chemical structures shown in P. P. Report No. 57736 Frames 4097 and 4097 A-D, the letter A appended to the trade name of the dyestuff of this example indicating that it is of American manufacture; and the appended letters CF indicating that it is "Copperfree." The dyed yarn had a much deeper color shade than the product of a control dyeing conducted under similar conditions but omitting the phosphorus-containing compound.

Example 4

A fibrous mixture of 50% of 70's grade scoured wool and 50% of fibers made from a copolymer composed of 60% of vinyl chloride and 40% of acrylonitrile was immersed in an aqueous dyebath adjusted to a pH of 7 with sodium hydroxide, and containing 1% of Vitrolan Orange R (Prototype No. 146) a metallized-type dyestuff, 5% of diammonium phosphate, 4% of the phosphorus-containing dye assistant recited in Example 1, and 1.33% of the dispersant recited in that example. The dyebath was raised to a boil, and sufficient ammonia was added dropwise to maintain the pH between 7 and 7.5 for 45 minutes. Dyeing then was continued at a boil for another 45 minutes. The dyed fibers were rinsed, scoured, and dried at 120° C. for 15 minutes. A good union dyeing was obtained. In a similar dyeing in which the dioxaphosphorinane dyeing assistant was omitted from the bath, almost all of the dye was on the wool.

Example 5

A scoured fabric knit from a yarn made from a copolymer composed of 66% acrylonitrile, 24% vinyl chloride and 10% vinylidene chloride was immersed in an aqueous bath held at a pH of 6, and containing 5% of Xylene Milling Blue GL, and acid-type dyestuff, 5% of the phosphorus-containing compound recited in Example 1, and 1.25% of the dispersant recited in that example. The dyebath was raised to a boil and dyeing continued for 30 minutes. Then 40% of sodium sulfate was added and dyeing at the boil continued for 30 minutes. After scouring the dyed fabric and drying at 115° C. for 20 minutes the fabric was dyed to a medium shade, which was much deeper than that obtained in a similar dyeing in which the dyeing assistant was omitted.

Example 6

Following the general procedure described in Example 2, a fabric knit from a yarn made from a copolymer composed of 40% of acrylonitrile and 60% of vinyl chloride was dyed in an aqueous dyebath containing 5% of Xylene Milling Blue GL, 2% of 5-butyl-5-ethyl-2-(2-ethylhexyloxy)-2-thiono-1,3,2-dioxaphosphorinane, and 0.5% of "Tergitol" Dispersant NP-35. After scouring and drying the dyed fabric as in Example 2 the fabric had a much deeper shade than that obtained in a similar dyeing in which no dyeing assistant was used.

Similar results were secured by substituting 2% of 5,5-diethyl-2-(2-ethylhexyloxy)-2-thiono-1,3,2-dioxaphosphorinane in this example for the thiono-dioxaphosphorinane recited therein.

Example 7

Following the general procedure recited in Example 2, a fabric knit from a yarn made from a resinous copolymer composed of 66.3% of acrylonitrile and 33.7% of vinyl chloride was dyed in an aqeous dyebath containing 5% of Vitrolan Orange R, 2% of 5-butyl-5-ethyl-2-(2-ethylhexyloxy)-2-oxo-1,3,2-dioxaphosphorinane, and 1% of "Tergitol" dispersant NP-35.

The dyed fabric, after scouring and drying, had a much deeper color shade than that obtained in a similar dyeing but omitting the dioxaphosphorinane.

Example 8

Scoured yarn made from a copolymer composed of 40% of acrylonitrile and 60% of vinyl chloride was immersed in an aqueous dyebath having a pH of 5, and containing 10% of Xylene Milling Blue GL, 2.5% of 2,2'-diethylene glycol bis(5-ethyl-2-oxo-4-propyl-1,3,2-dioxaphosphorinane), 2% of a dispersing agent being marketed under the trade name "Peregal OK," 2% of cupric sulfate, and 1% of zinc formaldehydesulfoxylate. The dyebath and contents were brought to a boil and dyeing at the boil was continued for 90 minutes. The dyed yarn was scoured and dried at 115° C. for 20 minutes. The excellent full shade of color obtained was very much deeper than that obtained in a similar dyeing but omitting the dioxaphosphorinane-type dyeing assistant.

*Example 9*

Following the general procedure described in Example 8, a quantity of the same yarn was immersed and dyed in an aqueous dyebath having a pH of 5, and containing 5% of Xylene Milling Blue GL, 2.5% of 5-ethyl-2-(p-methylphenoxy)-2-oxo-4-propyl - 1,3,2 - dioxaphosphorinane, 2% of a dispersing agent being marketed as "Tergitol" 7, 1% of cupric sulfate, and 0.5% of zinc formaldehydesulfoxylate. Dyeing at the boil was continued for 1 hour.

An excellent uniform full color shade was obtained on the yarn. The physical properties of the yarn were satisfactory.

*Example 10*

Staple fiber made from a copolymer composed of 40% acrylonitrile and 60% vinyl chloride was dyed in an aqueous dyebath containing 10% of Eastone Fast Red GLF, an acetate-type dyestuff, 5% of 2-(2-cyanoethoxy)-5-ethyl-2-oxo-4-propyl-1,3,2-dioxaphosphorinane, 1% of "Tergitol" 7 dispersant, and 80% of sodium sulfate. The bath was brought to a boil and dyeing at the boil continued for 1 hour. The dyed fiber, after scouring at 70° C., had a much deeper shade of color than that obtained in a similar dyeing wherein the phosphorus-containing compound had been omitted from the dyebath.

*Example 11*

Yarn made from a copolymer of acrylonitrile and vinyl chloride and containing 40% of acrylonitrile was immersed in an aqueous dyebath containing 5% of Eastman Fast Blue GLF (an acetate-type dyestuff), 2.5% of 2-2'-triethylene glycol bis(5-ethyl-2-oxo-4-propyl-1,3,2-dioxaphosphorinane), and 1% of "Tergitol" 7 dispersant. The dyebath was gradually heated to the boil and dyeing continued for 30 minutes at the boil. Then 100% of sodium sulfate was added and the dyeing continued at the boil for another 30 minutes. The dyed yarn, after scouring and drying at 115° C. for 20 minutes, had an excellent uniform full color shade and had a color depth comparable to that imparted to the yarn by a similar dyeing conducted without the phosphorus-containing compound but using 10% of the same dyestuff.

*Example 12*

Following the general procedure and conditions recited in Example 8, yarn made from a copolymer composed of 40% acrylonitrile and 60% of vinyl chloride was dyed in an aqueous dyebath like that of Example 8 with the exception that the dyeing assistant used was 5-ethyl-2-phenoxy-2-oxo - 4 - propyl - 1,3,2 - dioxaphosphorinane. The dyed article had a very much deeper shade than that obtained in a similar dyeing omitting the dyeing assistant.

*Example 13*

Following the procedure described in Example 9, and employing the same yarn and dyebath ingredients named therein, with the exception that the dyeing assistant employed was 2.5% of 2-ethyl-1,3-hexanediol bis(5-ethyl-2-oxo-4-propyl-1,3,2-dioxaphosphorinane), the dyed yarn had much deeper shade of color than those obtained in similar dyeings omitting such assistant.

*Example 14*

A knit fabric made from a copolymer containing 40% of acrylonitrile and 60% of vinyl chloride was scoured and immersed in an aqueous dyebath adjusted to a pH of 5 with sulfuric acid and containing 5% of Celliton Fast Navy Blue BA–CF (Prototype No. 232), an acetate-type dyestuff, 1% of "Tergitol" Dispersant NP–35, and 2% of 2,2-(p,p'-isopropylidenediphenoxy) bis(5,5-diethyl-2-oxo-1,3,2-dioxaphosphorinane) having the structure

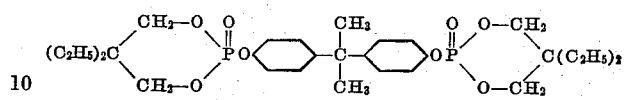

Such compound is made by reacting diphenylolpropane with 2-chloro-5,5-diethyl-2-oxo-1,3,2-dioxaphosphorinane as described in the pending application, Serial No. 346,525 of W. M. Lanham, filed April 2, 1953. The dyebath and contents were heated to boiling and dyeing continued at a boil for 30 minutes. Then 40% of sodium sulfate was added and boiling continued for 30 minutes. The dyed fabric, after scouring and drying at 115° C. was dyed to a deeper shade than that secured in a similar dyeing in which the phosphorus-containing dyeing assistant was omitted from the dyebath.

Like results were secured in two identical runs with the exception that in one thereof 5% of Xylene Milling Blue GL was the dyestuff used, and in the 5% of Vitrolan Orange R, a metallized dyestuff, was employed.

*Example 15*

Following the procedure described in Example 14, a quantity of the knit fabric disclosed in that example was dyed in an aqueous dyebath adjusted to a pH of 5 with sulfuric acid, and containing 5% of Xylene Milling Blue GL, 5% of 5,5-diethyl-2-methoxy-2-oxo-1,3,2-dioxaphosphorinane, and 1.25% of "Tergitol" Dispersant NP–35. The dyed fabric had a much deeper shade of color than that obtained in a similar dyeing in which the dioxaphosphorinane-type dyeing assistant was not used.

*Example 16*

Vat-type dyestuffs effectively can be used in the process. Thus, a fabric knit from yarn made from an acrylonitrile-vinyl chloride copolymer resin containing 40% of acrylonitrile and 60% of vinyl chloride was dyed in an aqueous dyebath containing 15% of Sulfanthrene Blue 2BD Double Paste, Color Index No. 1184, a vat-type dyestuff, 2.5% of 5-ethyl-2-(2-ethylhexyloxy)-2-oxo-4-propyl-1,3,2-dioxaphosphorinane, 0.8% of "Tergitol" Dispersant NP–35 and 4% of "Nacconol NR" wetting agent. The bath to fabric ratio was 30 to 1, by weight. After entering the fabric the dyebath was heated to 80° C. and 10% of sodium hydroxide and 12% of sodium hydrosulfite were added. After 10 minutes at 80° C. 80% of sodium sulfate was added, the bath heated to a boil and the dyeing continued for 30 minutes. After rinsing the fabric in cold water it was treated in another aqueous bath containing 2.5% of cupric sulfate and 5% of hydrogen peroxide at 95°–99° C. for 10 minutes. The dyed fabric then was scoured at a boil, rinsed, and dried at 110° C. The fabric was dyed to a shade very much deeper than that obtained in a similar dyeing in which the phosphorus-containing dyeing assistant was omitted from the dyebath.

*Example 17*

A quantity of textile fibers made from a resinous copolymer containing 60% of vinyl chloride and 40% of acrylonitrile was immersed in the aqueous dyebath herein described and the temperature bath raised to about 66° C. and the dyeing conducted at this temperature for 20 minutes. The aqueous dyebath contained 10% of Ponsol Flavone Paste (Prototype No. 9), a vat-type dyestuff, previously reduced at 49° C. in water containing 2% of sodium hydrosulfite and 2% of sodium hydroxide. The dyebath also contained 5% of the dioxaphosphorinane dyeing assistant recited in Example 1, 1% of "Tergitol"

Dispersant NP-35, 4% of Igepon P-51, 8% of sodium hydrosulfite and 8% of sodium hydroxide. The fibers then were rinsed and oxidized in an aqueous bath containing 2% of sodium perborate for 20 minutes at 85° C. The oxidized dyed fibers then were scoured and relustered at 120° C. in dry heat for 15 minutes.

The fibers were dyed to a much deeper shade than that obtained in a similar dyeing in which the dioxaphosphorinane-type dye assistant was omitted.

Even extremely small amounts of these dyeing assistants often are effective for the purpose as shown in the following example.

*Example 18*

A quantity of a knitted fabric of the type described in Example 1 was scoured and then immersed in an aqueous dyebath adjusted to a pH of 8.5 with ammonia and containing 5% of Anthraquinone Blue SKY (Color Index No. 1088) and 0.2% of 5-ethyl-2-(2-ethylhexyloxy)-2-oxo-4-propyl-1,3,2-dioxaphosphorinane and 0.04% "Tergitol" Dispersant NP-35. The dyebath temperature was slowly brought to a boil and dyeing then continued for 60 minutes. The dyed fabric was scoured and dried for 15 minutes at 120° C. The dyed fabric had a deeper shade than that secured in a similar dyeing in which the dioxaphosphorinane-type dyeing assistant was not used.

The following example illustrated the practice of the invention in connection with pad dyeing.

*Example 19*

A fabric woven from fibers of the resin described in Example 17 was dyed by means of a pad bath consisting of 2.5% Eastman Fast Blue GLF (an acetate-tape dye), 1% of the dioxaphosphorinane-type assistant recited in Example 18, 0.25% of Igepon T-51, and 0.25% of "Tergitol" Dispersant NP-35, based upon the weight of the dyebath. The fabric was run through a pad with two dips in the pad bath and two nips to give a wet pickup of 72%. The padded fabric then was heated under tension at 140° C. for 8 minutes to fix the dye. After scouring and rinsing the dyed fabric, the color shade obtained was very much deeper and the fastness properties superior to those of a similar dyeing in which the dioxaphosphorinane-type dyeing assistant was omitted.

If desired the textile article can be given a pretreatment with the dyeing assistant prior to the actual dyeing operation. Thus, a quantity of the knitted fabric described in Example 1 was placed in an aqueous bath containing 2% of the dyeing assistant recited in that example and 1% of "Tergitol" Dispersant NP-35, using a 30:1 bath to fabric ratio. The bath was raised to a boiling temperature which was held for 30 minutes. The excess bath was removed and the fabric rinsed with cold water. The pretreated fabric then was dyed in an aqueous solution containing 5% of Xylene Milling Blue GL (Color Index No. 833) and 1% of "Tergitol" Dispersant NPX, and brought to a pH of 5 with sulfuric acid. The dyebath was slowly raised to a boil and dyeing continued at that temperature for 60 minutes. The dyed article then was scoured and dried at 115° C. The color shade thereof was considerably deeper than that obtained in a similar dyeing in which no dyeing assistant was used.

Among dyestuffs useful in this process are the following:

Acetate-type dyestuffs:

| Name | C. I. No. |
|---|---|
| Eastone Fast Red GLF[1] | None. |
| Eastman Fast Blue GLF, Conc.[2] | Do. |
| Celliton Fast Navy Blue BA–CF | Prototype No. 232. |
| Celliton Fast Blue AF | Prototype No. 227. |
| Celanthrene Violet BGF | None. |
| Artisil Direct Black BKZ | Do. |
| Amacel Green Blue II | Do. |
| Nacelan Pink B | Prototype 234. |
| Duranol Blue 2G 300 | None. |
| Eastman Fast Yellow 4RLF | Do. |
| Eastman Fast Yellow GLF | Prototype No. 537. |
| Eastone Blue BGF | Prototype No. 538. |
| Xylene Milling Blue GL | 833. |
| Cloth Red G | 249. |
| Anthraquinone Blue Sky | 1088. |
| Milling Red SWB 125% Conc | 430. |

Metallized dyes:

| Name | |
|---|---|
| Supralan Yellow N | None. |
| Supralan Yellow NR | Do. |
| Irgalan Grey BL | Do. |
| Irgalan Brown 2RL | Do. |
| Irgalan Yellow GL | Do. |
| Capracyl Red B | Do. |
| Capracyl Blue G | Do. |
| Capracyl Brown RD | Do. |
| Nyalan Red B | Do. |
| Nyalan Red G | Do. |
| Nyalan Orange G | Do. |
| Nyalan Yellow 2G | Do. |
| Nyalan Black B | Do. |
| Nyalan Navy Blue B | Do. |
| Nyalan Brown 2G | Do. |
| Nyalan Brown B | Do. |
| Nyalan Olive G | Do. |
| Violan Fast Yellow R | Do. |
| Violan Fast Red B | Do. |
| Vitrolan Orange R | Prototype No. 146. |

Vat-type dyestuffs:

| Name | |
|---|---|
| Sulfathrene Blue 2 BD, double paste | 1184. |
| Sulfanthrene Red 3B paste | 1212. |
| Sulfanthrene Scarlet GX paste | None. |
| Ponsol Navy Blue double paste | Prototype No. 522. |
| Ponsol Flavone GCN paste | Prototype No. 9. |

[1] Made as described in U. S. Patents 2,516,107 and 2,516,302.
[2] Made as described in U. S. Patents 2,641,602 and 2,651,641.

The invention is susceptible of modification within the scope of the appended claims.

We claim:

1. Process for dyeing textile articles made from resinous polyacrylonitriles and polymers of acrylonitrile with at least one other vinyl compound, which comprises treating said article with an aqueous bath containing a phosphorus-containing dyeing assistant and a dispersing agent for said assistant, the said dyeing assistant being a compound having a structure corresponding to the formula:

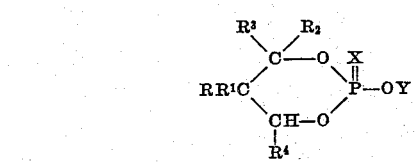

wherein R, $R^1$, $R^2$, $R^3$, and $R^4$, respectively, represents a radical of the class consisting of hydrogen and the alkyl groups having 1 to 8 carbon atoms; X represents a radical of the class consisting of oxygen and sulfur; and Y represents a member of the class consisting of the alkyl, phenyl, tolyl, cyanoalkyl and

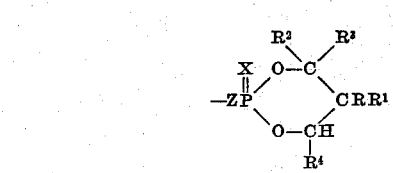

radicals wherein R, $R^1$, $R^2$, $R^3$, $R^4$ and X are as aforesaid; and Z represents a divalent radical having two terminal oxy groups and selected from the class consisting of the divalent dioxyalkylene residues of the alkylene glycols and polyalkylene glycols, and corresponding residues of dihydric phenols, biphenols and diphenylolalkanes; and at some stage while the dyeing assistant is present on the article heating the article in an aqueous dyebath containing a dyestuff of the class consisting of the acid-type, the acetate-type, the vat-type and the metallized-type dyestuffs.

2. Process for dyeing textile articles made from resinous polyacrylonitriles and copolymers of acrylonitrile with at least one other vinyl compound, which comprises heating the said article in an aqueous bath containing a dyestuff of the class consisting of the acid-type, the acetate-type, the vat-type and the metallized-type dyestuffs, about 0.2% to about 10% of a phosphorus-containing dyeing assistant, and a dispersing agent for said assistant, the said dyeing assistant being a compound having a structure corresponding to the formula:

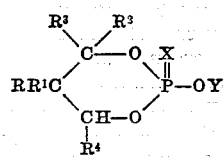

wherein R, R¹, R², R³ and R⁴, respectively, represents a radical of the class consisting of hydrogen and the alkyl groups having 1 to 8 carbon atoms; X represents a radical of the class consisting of oxygen and sulfur; and Y represents a member of the class consisting of the alkyl, phenyl tolyl, cyanoalkyl, and

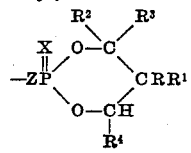

radicals, wherein R, R¹, R², R³, R⁴ and X are as aforesaid, and Z represents a divalent radical having two terminal oxy groups and selected from the class consisting of the divalent dioxyalkylene residues of the alkylene glycols and polyalkylene glycols, and corresponding residues of dihydric phenols, biphenols and diphenylolalkanes.

3. Process as defined in claim 1 wherein the dyeing assistant is a 2-oxo-2-phenoxy-1,3,2-dioxaphosphorinane substituted on at least one carbon atom of the heterocyclic ring by at least one alkyl group having 1 to 8 carbon atoms.

4. Process as defined in claim 1 wherein the dyeing assistant is a 2-thiono-2-phenoxy-1,3,2-dioxaphosphorinane substituted on at least one carbon atom of the heterocyclic ring by at least one alkyl group having 1 to 8 carbons atoms.

5. Process as defined in claim 1 wherein the dyeing assistant is a 2-(alkylphenoxy)-2-oxo-1,3,2-dioxaphosphorinane substituted on at least one carbon atom of the heterocyclic ring by at least one alkyl group having 1 to 8 carbon atoms.

6. Process as defined in claim 1 wherein the dyeing assistant is a polyethylene glycol bis(2-oxo-1,3,2-dioxaphosphorinane) substituted on at least one carbon atom of each heterocyclic ring with one to two alkyl groups having 1 to 8 carbon atoms.

7. Process as defined in claim 1 wherein the dyeing assistant is an alkylene glycol bis(2-oxo-1,3,2-dioxaphosphorinane) substituted on at least one carbon atom of each heterocyclic ring with one to two alkyl groups having 1 to 8 carbon atoms.

8. Process as defined in claim 1 wherein the dyeing assistant is a dihydric phenol bis(2-oxo-1,3,2-dioxaphosphorinane) substituted on at least one carbon atom of each heterocyclic ring with one to two alkyl groups having 1 to 8 carbon atoms.

9. Process as defined in claim 1 wherein the dyeing assistant is a symmetrical (p,p'-alkylidenediphenoxy)bis-(2-oxo-1,3,2-dioxaphosphorinane) substituted on at least one carbon atom of each heterocyclic ring with one to two alkyl groups having 1 to 8 carbon atoms.

10. Process for dyeing textile articles made from resinous polyacrylonitriles and copolymers of acrylonitrile with at least one other vinyl compound of the class consisting of vinyl chloride, vinyl acetate, vinyl pyridine and vinylidine chloride, which comprises heating the said article in an aqueous bath containing a dyestuff of the class consisting of the acid-type, the acetate-type, the vat-type and the metallized-type dyestuffs, about 0.2% to about 10% of a phosphorus-containing dyeing assistant, and a dispersing agent for said assistant, the said dyeing assistant being an unsubstituted 2-alkoxy-2-oxo-1,3,2-dioxaphosphorinane.

11. Process for dyeing textile articles made from resinous polyacrylonitriles and copolymers of acrylonitrile with at least one other vinyl compound of the class consisting of vinyl chloride, vinyl acetate, vinyl pyridine and vinylidine chloride, which comprises heating the said article in an aqueous bath containing a dyestuff of the class consisting of the acid-type, the acetate-type, the vat-type and the metallized-type dyestuffs, about 0.2% to about 10% of a phosphorus-containing dyeing assistant, and a dispersing agent for said assistant, the said dyeing assistant being a 2-alkoxy-2-oxo-1,3,2-dioxaphosphorinane substituted on at least one of the carbon atoms of the heterocyclic ring by at least one alkyl goup having 1 to 8 carbon atoms.

12. Process for dyeing textile articles made from resinous polyacrylonitriles and copolymers of acrylonitrile with at least one other vinyl compound of the class consisting of vinyl chloride, vinyl acetate, vinyl pyridine and vinylidine chloride, which comprises heating the said article in an aqueous bath containing a dyestuff of the class consisting of the acid-type, the acetate-type, the vat-type and the metallized-type dyestuffs, about 0.2% to about 10% of a phosphorus-containing dyeing assistant, and a dispersing agent for said assistant, the said dyeing assistant being an unsubstituted 2-alkoxy-2-thiono-1,3,2-dioxaphosphorinane.

13. Process for dyeing textile articles made from resinous polyacrylonitriles and copolymers of acrylonitrile with at least one other vinyl compound of the class consisting of vinyl chloride, vinyl acetate, vinyl pyridine and vinylidine chloride, which comprises heating the said article in an aqueous bath containing a dyestuff of the class consisting of the acid-type, the acetate-type, the vat-type and the metallized-type dyestuffs, about 0.2% to about 10% of a phosphorus-containing dyeing assistant, and a dispersing agent for said assistant, the said dyeing assistant being a 2-alkoxy-2-thiono-1,3,2-dioxaphosphorinane substituted on at least one of the carbon atoms of the heterocyclic ring by at least one alkyl group having 1 to 8 carbon atoms.

14. Process for dyeing textile articles made from resinous polyacrylonitriles and copolymers of acrylonitrile with at least one other vinyl compound of the class consisting of vinyl chloride, vinyl acetate, vinyl pyridine and vinylidine chloride, which comprises heating the said article in an aqueous bath containing a dyestuff of the class consisting of the acid-type, the acetate-type, the vat-type and the metallized-type dyestuffs, about 0.2% to about 10% of a phosphorus-containing dyeing assistant, and a dispersing agent for said assistant, the said dyeing assistant being a 2-(2-ethylhexyloxy)-2-oxo-1,3,2-dioxaphosphorinane substituted on at least one of the carbon atoms in the heterocyclic ring by at least one alkyl group having 1 to 8 carbon atoms.

15. Process for dyeing textile articles made from resinous polyacrylonitriles and copolymers of acrylonitrile with at least one other vinyl compound of the class consisting of vinyl chloride, vinyl acetate, vinyl pyridine and vinylidine chloride, which comprises heating the said article in an aqueous bath containing a dyestuff of the class consisting of the acid-type, the acetate-type, the vat-type and the metallized-type dyestuffs, about 0.2% to about 10% of a phosphorus-containing dyeing assistant, and a dispersing agent for said assistant, the said dyeing assistant being 5-ethyl-2-(2-ethylhexyloxy)-2-oxo-4-propyl-1,3,2-dioxaphosphorinane.

16. Process for dyeing textile articles made from resinous polyacrylonitriles and copolymers of acrylonitrile with at least one other vinyl compound of the class consisting of vinyl chloride, vinyl acetate, vinyl pyridine and vinylidine chloride, which comprises heating the said article in an aqueous bath containing a dyestuff of the class consisting of the acid-type, the acetate-type, the vat-type and the metallized-type dyestuffs, about 0.2% to about 10% of a phosphorus-containing dyeing assistant, and a dispersing agent for said assistant, the said dyeing assistant being 5-butyl-5-ethyl-2-(2-ethylhexyloxy)-2-oxo-1,3,2-dioxaphosphorinane.

17. Process for dyeing textile articles made from resinout polyacrylonitriles and copolymers of acrylonitrile with at least one other vinyl compound of the class consisting of vinyl chloride, vinyl acetate, vinyl pyridine and vinylidine chloride, which comprises heating the said article in an aqueous bath containing a dyestuff of the class consisting of the acid-type, the acetate-type, the vat-type and the metallized-type dyestuffs, about 0.2% to about 10% of a phosphorus-containing dyeing assistant, and a dispersing agent for said assistant, the said dyeing assistant being a 2-cyanoalkyl-2-oxo-1,3,2-dioxaphosphorinane substituted on at least one of the carbon atoms in the heterocyclic ring by at least one alkyl group having 1 to 8 carbon atoms.

References Cited in the file of this patent

UNITED STATES PATENTS

| | | |
|---|---|---|
| 2,022,710 | Esselen | Dec. 3, 1935 |
| 2,524,811 | Koberlein | Oct. 10, 1950 |
| 2,646,339 | Ward | July 21, 1953 |
| 2,654,652 | Ray | Oct. 6, 1953 |
| 2,661,366 | Gamrath | Dec. 1, 1953 |

FOREIGN PATENTS

| | | |
|---|---|---|
| 1,034,494 | France | Apr. 8, 1953 |
| 741,457 | Germany | Aug. 8, 1944 |

OTHER REFERENCES

Am. Dyestuff Reporter for Feb. 4, 1952, pp. P-75–P-78.